United States Patent Office 3,787,477
Patented Jan. 22, 1974

3,787,477
PREPARATION OF CYANOHYDRINS
Gary J. Matthews, Boulder, Colo., assignor to Syntex Corporation, Panama, Panama
No Drawing. Filed Feb. 18, 1972, Ser. No. 227,605
Int. Cl. C07c 121/74
U.S. Cl. 260—465 F
8 Claims

ABSTRACT OF THE DISCLOSURE

Disclosed is a process for preparing cyanohydrins involving the step of treating an aldehyde with sodium cyanide and acetic acid. The preparation of α-hydroxy-α-phenylacetonitrile from benzaldehyde is illustrated. The products are known and can be converted, for example, to α-aminoacids.

---

The present invention relates to advances in organic process chemistry. More particularly, the present invention is directed to a new method for preparing benzaldehyde cyanohydrins, e.g. mandelonitrile, which are useful in the preparation of α-aminoacids, e.g. α-amino-α-phenylacetic acid (α-phenylglycine) through the nitrile, e.g. α-amino-α-phenylacetonitrile, by ammonolysis followed by hydrolysis.

The cyanohydrin of benzaldehyde is known and has been prepared via several methods. For example, U.S. Pat. 2,748,154 describes the preparation of benzaldehyde cyanohydrin, i.e. mandelonitrile, by reacting benzaldehyde and hydrocyanic acid (HCN) in the liquid phase and in the presence of catalytic amounts of an aliphatic monocarboxylic acid and an alkali metal salt thereof. The method employs excess amounts of hydrocyanic acid with all the attendant disadvantages connected with its extreme toxicity. This patent is silent as to the possibility of employing amounts of carboxylic acid and a salt thereof which are greater than catalytic amounts, thus relying exclusively on extrinsically introduced hydrocyanic acid, and the handling disadvantages associated therewith.

On the other hand, the in situ generation of hydrocyanic acid is difficult to achieve with consistent, reliable and efficient success. The use of sodium cyanide for this purpose is more efficient when used with acetic acid versus hydrogen chloride, as reported by Sandhu et al. in Indian Journal of Chemistry, 48, 89 (1971) which describes the preparation of α-anilino-α-phenylacetonitrile by the one-step reaction of benzaldehyde, sodium cyanide, acetic acid, and aniline in ethanol solution. It is known, for example, that sodium cyanide catalyzes a competing reaction with benzaldehyde which seriously detracts from good yields of the desired cyanohydrin product. Sandhu et al. avoid this by having aniline present in the reaction mixture to react with the cyanohydrin as formed.

The present invention provides a novel, one-step preparation of benzaldehyde cyanohydrin (e.g. α-hydroxy-α-phenylacetonitrile; mandelonitrile) of the formula:

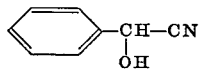

and substituted derivatives thereof, notably para hydroxy, methyl, methoxy, and halo (preferably chloro and fluoro) benzaldehyde cyanohydrins, based upon the efficient in situ generation of hydrocyanic acid (HCN) from sodium cyanide using acetic acid. The hazards of hydrocyanic acid handling are thus avoided as is the necessity of using aniline or other basic catalysts, as taught by the prior art. The method hereof thus permits the isolation and recovery of cyanohydrin product and in good, reproducible yields complemented by operational ease.

The present invention provides a process which comprises reacting benzaldehyde or a substituted benzaldehyde with at least about an equivalent amount each of sodium cyanide and acetic acid, under reactive conditions, to give the corresponding α-hydroxy-α-phenylacetonitrile or phenyl substituted α-hydroxy-α-phenylacetonitrile.

The reaction proceeds effectively when the reactants are contacted on an approximate equal molar basis, i.e. about one mole of each of sodium cyanide and acetic acid per mole of benzaldehyde reactant. Thus, the term "at least about an equivalent amount," as given herein, means the use of such approximately equal molar quantities. Generally, the reaction proceeds, and the term thus means, the use of amounts of sodium cyanide ranging from about 1.0 to about 2 or more moles and amounts of acetic acid ranging from about 1.0 to about 2 or more moles, each per mole of benzaldehyde or substituted benzaldehyde reactant. In the preferred embodiments, a slight molar excess of sodium cyanide over the amount of aldehyde reactant and, in turn, a slight molar excess of acetic acid over the amount of sodium cyanide is employed.

The term "reactive conditions" includes reaction temperatures of from about 0° to about 25° C., preferably about 5° to about 15° C., optionally under pressure but preferably under atomspheric pressure conditions. The reaction is optionally conducted in liquid organic reaction medium. Suitable media include aliphatic and aromatic hydrocarbons, such as n-pentane, n-hexane, octane, benzene, toluene, xylene, and so forth, chlorinated hydrocarbons, such as methylene chloride, chloroform, and carbon tetrachloride, and ethers, such as diethyl ether, or mixtures of two or more of the above. The use of such media, preferably also under aqueous conditions, provides the convenience of a reaction solution containing product in a phase separate from the aqueous inorganic salt solution which facilitates product separation and recovery.

The reaction can be conducted in any convenient order or fashion. In one embodiment, an aqueous sodium cyanide solution is contacted with a solution of the benzaldehyde reactant in acetic acid, glacial or aqueous. In another embodiment, sodium cyanide can be dispersed in acetic acid, glacial or aqueous, and the benzaldehyde reactant added thereto. The reactants are then maintained at the given temperature range for a period of time sufficient to produce product. The product is conveniently recovered by separation of the organic-inorganic phases, if present, and/or filtration, extraction, evaporation, chromatography, and so forth. The reaction is preferably conducted in a closed system.

The following examples serve to further illustrate the present invention.

EXAMPLE 1

A mixture of 73 grams of cold water, 68.0 g. (1.13 moles) of acetic acid, glacial, and 106 g. (1.00 mole) of benzaldehyde is cooled to 8 to 10° C. and stirred under nitrogen. A mixture of 60 g. of ice, 56.7 g. (1.10 moles) of sodium cyanide, and 105 g. of cold water is maintained under 5 p.s.i.g. nitrogen with stirring and cooling, to 8 to 15° C. Then, the cold sodium cyanide solution is added to the benzaldehyde mixture over a period of 40 minutes under 5 p.s.i.g. nitrogen. The resultant mixture is cooled to 4 to 6° C. over 30 minutes with stirring. With stirring 340 g. of cold mixed xylenes is added and the reaction mixture cooled to 2 to 4° C. The stirring is then stopped and the reaction mixture left to stand for 15 minutes at 2 to 4° C. The organic layer is separated and dried to give a solution containing 95 to 99% by weight of α-hydroxy-α-phenylacetonitrile (mandelonitrile).

EXAMPLE 2

A mixture of 68 grams (1.13 moles) of acetic acid and 73 g. of water, in 120 g. (1.00 mole) of p-methylbenzaldehyde is stirred at 15° C. and a solution of 56.7 g. (1.10 moles) of sodium cyanide in 105 ml. of water is added thereto over a rate such as to maintain the reaction mixture temperature at from 5° to 15° C. The mixture is stirred at 5 to 10° C. for 15 to 30 minutes. The mixture is then extracted with 340 g. of cold benzene. Careful separation of the organic phase gives a solution of 117 g. (0.98 mole) of α-hydroxy-α-(p-methylphenyl)-acetonitrile.

EXAMPLE 3

The procedures of Examples 1 and 2 are repeated to prepare the following products from the respective starting compounds: α-hydroxy-α-(p-methoxyphenyl)-acetonitrole, α-hydroxy-α-(p-hydroxyphenyl)-acetonitrile, α-hydroxy-α-(p-chlorophenyl)-acetonitrile.

EXAMPLE 4

A mixture of 73 grams of cold water, 68.0 g. (1.13 moles) of acetic acid, glacial, and 106 g. (1.00 mole) of benzaldehyde is cooled to 8 to 10° C. and stirred under nitrogen. A mixture of 60 g. of ice, 56.7 g. (1.10 moles) of sodium cyanide, and 105 g. of cold water is maintained under 5 p.s.i.g. nitrogen with stirring and cooling, to 8 to 15° C. Then, the cold sodium cyanide solution is added to the benzaldehyde mixture over a period of 40 minutes under 5 p.s.i.g. nitrogen. The resultant mixture is cooled to 4 to 6° C. over 30 minutes with stirring. The stirring is then stopped and the reaction mixture left to stand for 15 minutes at 8 to 15° C. The organic layer is separated and dried to give 90 to 95% by weight of α-hydroxy-α-phenylacetonitrile (mandelonitrile).

What is claimed is:

1. A process which comprises reacting benzaldehyde or a substituted benzaldehyde wherein the substituent is selected from para hydroxy, methyl, methoxy, and halo with at least about an equivalent amount each of sodium cyanide and acetic acid to give the corresponding α-hydroxy-α-phenylacetonitrile or substituted phenyl α-hydroxy-α-phenylacetonitrile.

2. The process according to claim 1 conducted in aqueous medium.

3. The process according to claim 1 conducted at temperatures of from about 5° to about 15° C.

4. The process according to claim 3 conducted in aqueous medium.

5. The process according to claim 4 wherein α-hydroxy-α-phenylacetonitrile is prepared.

6. The process according to claim 1 conducted by contacting an aqueous sodium cyanide solution with a solution of the benzaldehyde reactant in acetic acid.

7. The process according to claim 6 conducted at temperatures of from about 5° to about 15° C.

8. The process according to claim 7 wherein α-hydroxy-α-phenylacetonitrile is prepared.

References Cited
UNITED STATES PATENTS
2,748,154   5/1956   Journeay _____ 260—465

LEWIS GOTTS, Primary Examiner
D. H. TORRENCE, Assistant Examiner

U.S. Cl. X.R.
260—465 E